United States Patent
Zhang et al.

(10) Patent No.: US 9,009,024 B2
(45) Date of Patent: Apr. 14, 2015

(54) PERFORMING SENTIMENT ANALYSIS

(75) Inventors: Lei Zhang, Chicago, IL (US); Riddhiman Ghosh, Sunnyvale, CA (US); Mohamed E. Dekhil, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 13/280,040

(22) Filed: Oct. 24, 2011

(65) Prior Publication Data

US 2013/0103386 A1 Apr. 25, 2013

(51) Int. Cl.
*G06F 17/27* (2006.01)
*G06F 17/28* (2006.01)
*G06F 17/21* (2006.01)
*G10L 21/00* (2013.01)

(52) U.S. Cl.
CPC .................................. *G06F 17/2785* (2013.01)

(58) Field of Classification Search
CPC . G06F 17/28; G06F 17/2785; G06F 17/2765; G06F 17/30654; G06F 17/21; G06F 17/2705; G06F 17/274; G06F 17/277; G06F 17/24; G06F 17/273; G06F 17/2735; G06F 17/276; G06F 17/30011; G06F 17/27; G06F 17/2755; G06F 17/2881; G06F 17/30023; G06F 17/30595; G06F 17/30731; G06F 17/211; G06F 17/241; G06N 5/02; G10L 15/18; G10L 15/183
USPC ............. 704/9, 10, 4, 8, 270, 270.1, 277, 275
See application file for complete search history.

(56) References Cited

U.S. PATENT DOCUMENTS

| | | | | |
|---|---|---|---|---|
| 6,963,848 | B1 * | 11/2005 | Brinkerhoff | 705/7.32 |
| 7,363,214 | B2 * | 4/2008 | Musgrove et al. | 704/9 |
| 7,430,552 | B2 * | 9/2008 | Cameron et al. | 1/1 |
| 7,509,230 | B2 * | 3/2009 | Fernandez et al. | 702/179 |
| 7,523,085 | B2 * | 4/2009 | Nigam et al. | 706/55 |
| 7,558,769 | B2 * | 7/2009 | Scott et al. | 706/45 |
| 7,937,265 | B1 * | 5/2011 | Pasca et al. | 704/9 |
| 8,554,701 | B1 * | 10/2013 | Dillard et al. | 706/12 |
| 2004/0078214 | A1 * | 4/2004 | Speiser et al. | 705/1 |
| 2005/0091038 | A1 * | 4/2005 | Yi et al. | 704/10 |
| 2005/0125216 | A1 * | 6/2005 | Chitrapura et al. | 704/1 |
| 2006/0085248 | A1 * | 4/2006 | Arnett et al. | 705/10 |
| 2006/0200341 | A1 * | 9/2006 | Corston-Oliver et al. | 704/5 |
| 2006/0200342 | A1 * | 9/2006 | Corston-Oliver et al. | 704/10 |
| 2006/0212897 | A1 * | 9/2006 | Li et al. | 725/32 |
| 2007/0078671 | A1 * | 4/2007 | Dave et al. | 705/1 |
| 2007/0143122 | A1 * | 6/2007 | Holloway et al. | 705/1 |

(Continued)

OTHER PUBLICATIONS

Mining and Summarizing Customer Reviews Minqing Hu KDD'04, Aug. 22-25, 2004.*

(Continued)

*Primary Examiner* — Edgar Guerra-Erazo

(57) ABSTRACT

There is provided a computer-implemented method of performing sentiment analysis. An exemplary method comprises identifying one or more sentences in a microblog. The microblog comprises an entity. The method further includes identifying one or more opinion words in the sentences based on an opinion lexicon. Additionally, the method includes determining, for each of the sentences, an opinion value for the entity. The opinion value is determined based on an opinion value for each of the opinion words in an opinion lexicon.

18 Claims, 5 Drawing Sheets

(56) References Cited

U.S. PATENT DOCUMENTS

| | | | |
|---|---|---|---|
| 2007/0214000 A1* | 9/2007 | Shahrabi et al. | 705/1 |
| 2008/0097758 A1* | 4/2008 | Li et al. | 704/240 |
| 2008/0109232 A1* | 5/2008 | Musgrove et al. | 705/1 |
| 2008/0215571 A1* | 9/2008 | Huang et al. | 707/5 |
| 2008/0249762 A1* | 10/2008 | Wang et al. | 704/9 |
| 2008/0249764 A1* | 10/2008 | Huang et al. | 704/9 |
| 2008/0270116 A1 | 10/2008 | Godbole et al. | |
| 2008/0313180 A1* | 12/2008 | Zeng et al. | 707/6 |
| 2009/0193011 A1 | 7/2009 | Blair-Goldensohn et al. | |
| 2009/0282019 A1* | 11/2009 | Galitsky et al. | 707/5 |
| 2009/0319342 A1* | 12/2009 | Shilman et al. | 705/10 |
| 2010/0023311 A1* | 1/2010 | Subrahmanian et al. | 704/2 |
| 2010/0169317 A1* | 7/2010 | Wang et al. | 707/736 |
| 2010/0185569 A1* | 7/2010 | Hu et al. | 706/12 |
| 2012/0185544 A1* | 7/2012 | Chang et al. | 709/206 |
| 2012/0259616 A1* | 10/2012 | Peng et al. | 704/9 |
| 2012/0278064 A1* | 11/2012 | Leary et al. | 704/9 |
| 2013/0036126 A1* | 2/2013 | Anderson | 707/754 |

OTHER PUBLICATIONS

Wu et al (hereafter Wu) "Phrase Dependency Parsing for Opinion Mining", Proceedings of the 2009 Conference on Empirical Methods in Natural Language Processing, pp. 1533-1541,Singapore, Aug. 6-7, 2009. c 2009 ACL and AFNLP.*

Narayanan et al (hereafter Narayanan ) Sentiment Analysis of Conditional Sentences ) Proceedings of the 2009 Conference on Empirical Methods in Natural Language Processing, pp. 180-189,Singapore, Aug. 6-7, 2009.*

Du, Weifu, et al., "Adapting Information Bottleneck Method for Automatic Construction of Domain-oriented Sentiment Lexicon", WSDM'10, Feb. 4-6, 2010, pp. 111-120, New York City, New York, USA, pp. 111-119.

Kanayama, Hiroshi, et al., "Fully Automatic Lexicon Expansion for Domain-oriented Sentiment Analysis", Proceedings of the 2006 Conference on Empirical Methods in Natural Language Processing (EMNLP 2006), Jul. 2006, pp. 355-363, Sydney.

Liu, Feifan, et al., "Improving Blog Polarity Classification via Topic Analysis and Adaptive Methods", Human Language Technologies: The 2010 Annual Conference of the North American Chapter of the ACL, Jun. 2010, pp. 309-312, Los Angeles, California.

McKendrick, Joe, "New Algorithm Spots Sarcasm in Customer Testimonials", SmartPlanet.com, May 21, 2010.

Shastri, Lokendra, et al., "Sentiment Extraction: Integrating Statistical Parsing, Semantic Analysis, and Common Sense Reasoning",Proceedings of the Twenty-Second Innovative Applications of Artificial Intelligence Conference (IAAI-10), 2010, pp. 1853-1858.

* cited by examiner

300

PERFORMING SENTIMENT ANALYSIS

BACKGROUND

Sentiment analysis is the computational study of people's opinions, appraisals, and emotions toward entities (e.g. products for sale, organizations, events and individuals). A growing online source of public opinion is the microblog. Microblogs are short web blogs, and are often posted on social media websites (e.g. FACEBOOK® and TWITTER®). People may provide, in microblogs, personal statuses, tweets, comments, etc. Opinions mined from microblogs may provide advantageous insights into public sentiments on entities. However, it may be difficult to identify and determine opinions for entities effectively using this class of data. Microblogs are typically short. For example, a tweet, which is a post on the TWITTER® network, is currently limited to a maximum of 140 characters. The data sources may also be noisy and prone to spam. Another issue is that opinions are commonly expressed in a manner specific to the domain, thereby incorporating emoticons, colloquial expressions, abbreviations, acronyms, etc. These characteristics may increase the computational complexity of sentiment analysis on microblogs.

BRIEF DESCRIPTION OF THE DRAWINGS

Certain examples of embodiments are described in the following detailed description and in reference to the drawings, in which.

DETAILED DESCRIPTION

Our approach to perform sentiment analysis on microblogging data is based on a function of opinion words in context. Opinion words are also known as opinion-bearing words or sentiment words. Positive opinion words are used to express some desired states while negative opinion words are used to express some undesired states. Examples of positive opinion words are "good" "wonderful" and "amazing". Examples of negative opinion words are "bad", "poor" and "terrible". The approach generally uses a dictionary of opinion words to identify and determine positive, negative and neutral sentiments. The dictionary of opinion words is called the opinion lexicon. The approach of using opinion words (the lexicon) to determine opinion orientations is called lexicon-based method.

However, existing lexicon-based methods originally focus on large opinionated corpus such as product reviews and may not take into account the characteristics of microblogs. For example, a user may write a microblog, "What is the best HP® desktop computer?". It is an interrogative sentence, which is frequently used in microblogs. Existing lexicon-based methods may recognize the opinion word "best" and determine that this user is expressing a positive opinion about HP® desktops. However, the user is simply asking a question and is not indicating any opinion. Besides, in some microblogs, multiple words with opposite polarities may appear together in the same sentence, making it challenging to determine an opinion of the overall statement.

In one embodiment, sentiment analysis on microblogs may be performed by applying data cleansing techniques and using a rules-driven opinion lexicon. In this way, opinion polarities may be determined on various entities discussed in microblogs.

Figure 1:
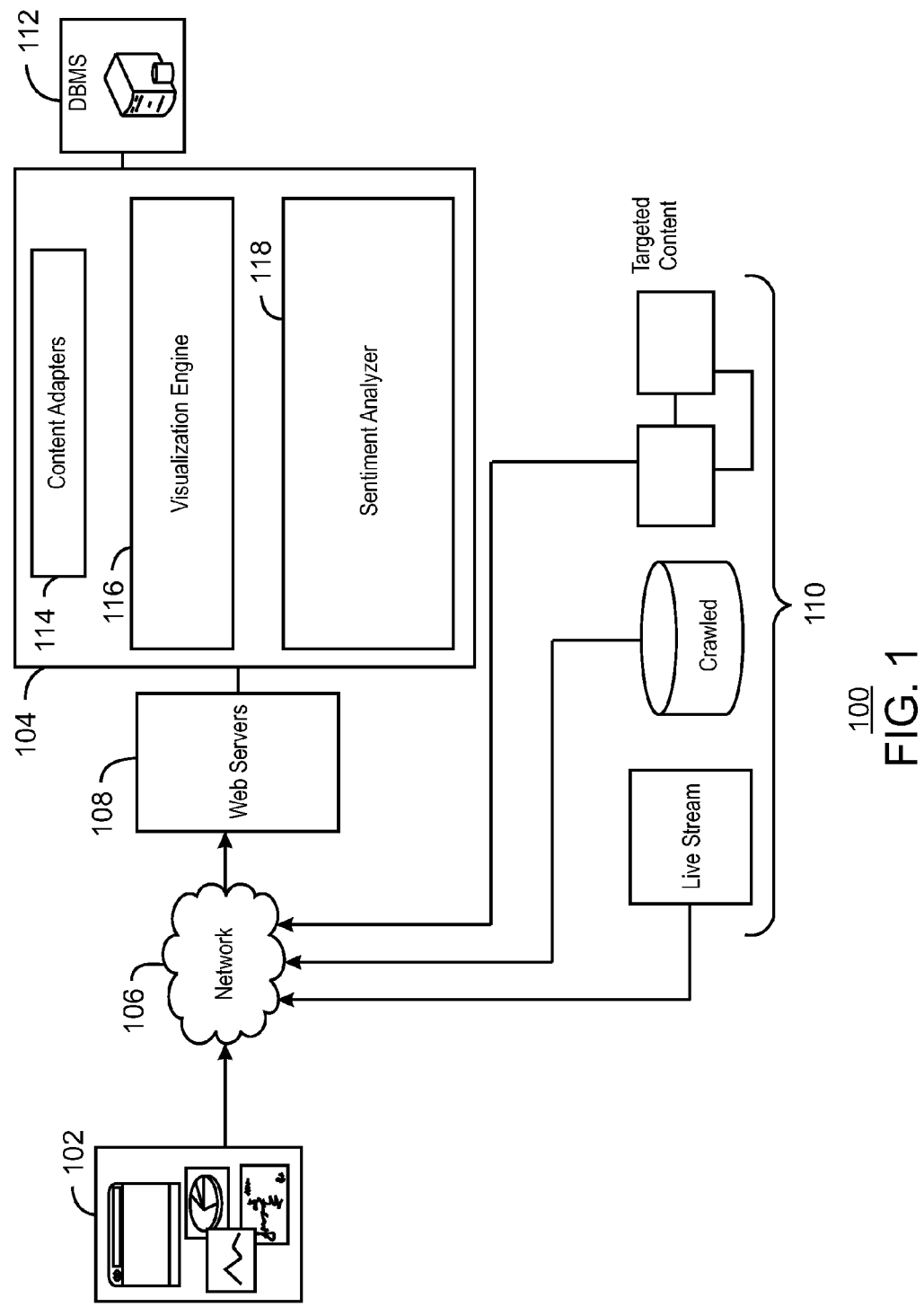
FIG. 1 is a block diagram of a system for sentiment analysis, according to an embodiment of the present techniques.

FIG. 1 is a block diagram of a system 100 for sentiment analysis, according to an embodiment of the present techniques. The system 100 includes various clients 102 and an application server 104, in communication over a network 106 and web servers 108. The clients 102 may include various computing devices, including mobile devices, among others. The clients 102 may display opinion data using various user interfaces, such as widgets, dashboards, graphical user interfaces (GUI), browser clients, etc. The application server 104 may perform sentiment analysis on microblogs from various sources 110. Sentiment analysis may be invoked by the clients 102 through web service invocation interfaces on the web servers 108. The microblog sources 110 may include live streams, crawled content, and targeted content. The crawled content may be aggregated. The application server 104 may use a database management system (DBMS) 112 to perform the sentiment analysis on the microblog sources 110. The DBMS 112 may include an opinion lexicon, identifying a set of opinion words. Each of these opinion words, such as "bad," and, "good," may be assigned an opinion polarity, e.g., positive or negative. The application server 104 may include content input adapters 114, a visualization engine 116, and a sentiment analyzer 118. The content adapters 114 may include adapters for Comma Separated Value files, or other format files, TWITTER®, review sites, adapter plugins, etc. The visualization engine 116 may provide visualizations of opinion, for display on the various clients 102. The visualization engine 116 may use visual analytics, server-side plotting and graphics, and bitmap rendering to generate the visualizations. The sentiment analyzer 118 may determine opinion polarities on entities discussed in each microblog from the various sources 110. The opinions for each of these entities may be stored in the DBMS 112 for use by the visualization engine 116. The sentiment processor 118 may include a pre-processor and data cleanser, a natural language processor, a domain-specific lexicon builder, and a sentiment polarity assignment engine. The pre-processor may filter out spam, duplicate microblogs, etc. The natural language processor may identify part-of-speech (POS) tag for each word or token in the microblogs. The domain-specific lexicon builder may determine polarities for domain-specific opinion words which do not exist in a general opinion lexicon. The sentiment polarity assignment engine may determine the opinion of entities in each sentence of microblogs.

Figure 2:
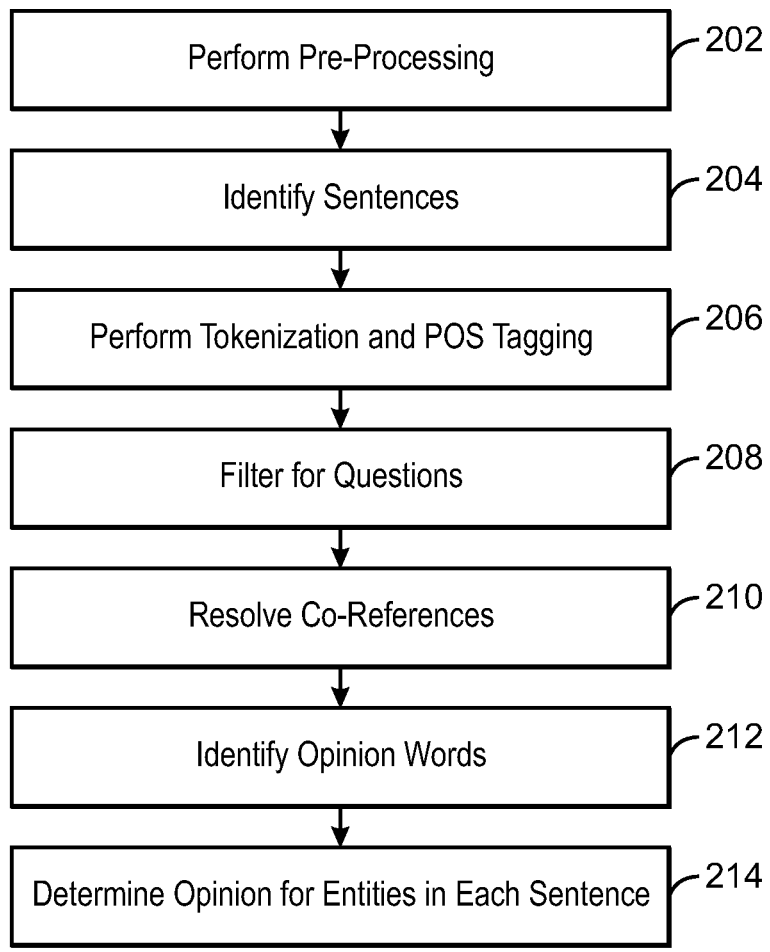
FIG. 2 is a process flow diagram showing a computer-implemented method for sentiment analysis according to an embodiment of the present techniques.

FIG. 2 is a process flow diagram showing a computer-implemented method 200 for sentiment analysis according to an embodiment of the present techniques. The method 200 may be performed by the sentiment analyzer 118. It should be understood that the process flow diagram is not intended to indicate a particular order of execution.

The method 200 may begin at block 202, where the sentiment analyzer 118 may perform pre-processing on the input microblogging data. The pre-processing may filter out noisy data, such as spam. For example, spam tweets may share the same author, content, and tweet structure. Duplicated data, such as re-tweets which do not add value for sentiment analysis, may also be filtered out in the pre-processing. In addition, popular abbreviations included in microblogs may be expanded to their full form. For example, the abbreviation, "wknd," used frequently in microblogs, may be expanded to, "weekend." In one embodiment, the DBMS 112 may include a dynamic lexicon of known abbreviations, and their corresponding full forms.

At block 204, the sentiment analyzer 118 may identify the sentences in each microblog. Sentences may be identified through customary boundaries, including punctuation, such as, periods, question marks, etc. Heuristic language rules may be used to find sentence boundaries.

At block 206, the sentiment analyzer 118 may perform tokenization and part-of-speech tagging on each of the sentences. In tokenization, each sentence may be further divided into tokens. Each of the tokens may then be tagged with the part-of-speech the token represents, e.g., nouns, adjectives, pronouns, etc.

At block 208, sentence type is detected which is a special step for analyzing microblogging data. Interrogative sentences (e.g. "What is the best HP® desktop in market?") are frequently used in microblogs. They often do not express any informative opinion on entities. It is necessary for use to identify and remove these sentences before sentiment analysis. The sentiment analyzer 118 may determine an interrogative sentence type based on pattern matching rules. The two matching patterns are as follows:
(a) "model word+auxiliary verb+ . . . "
(b) " . . . +question mark"
where "model word" refers to the first word in the sentence. It should belongs to the word set {what, where, when, why, who}. Auxiliary verb should belong to word set {am, is, are, was, were, am do, did, does}. And the question mark should be the last token in the sentence.

At block 210, the sentiment analyzer 118 may resolve co-references. It is common for people to use anaphoric expressions (e.g. pronouns) referring to the entity in a microblog and express opinions directly on them. For example, in a microblog, "I bought this iPhone yesterday. It is awesome!". "It" in the second sentence refers to the entity "iPhone". We need to resolve the coreference in the sentence. Otherwise, we lose opinions. In our work, we use a heuristic rule to perform coreference resolution in microblogs. The rule is that we choose the closest entity whose properties (e.g. gender) are compatible with the corresponding anaphoric expression as the referring entity. In the above example sentence, we can resolve that "It" in the second sentence refers to "iPhone" in the first sentence as "iPhone" is the closest and compatible entity for "It".

At block 212, the sentiment analyzer 118 may identify opinion words in each of the sentences based on the opinion lexicon. At block 214, the sentiment analyzer 118 may determine, for each of the sentences, an opinion for entities. The opinion may specify whether the sentence is positive, negative, or neutral with regard to the discussed entities. The opinion polarities may be determined based on the opinion words. The block 214 is described in greater detail with respect to FIG. 3.

Figure 3:
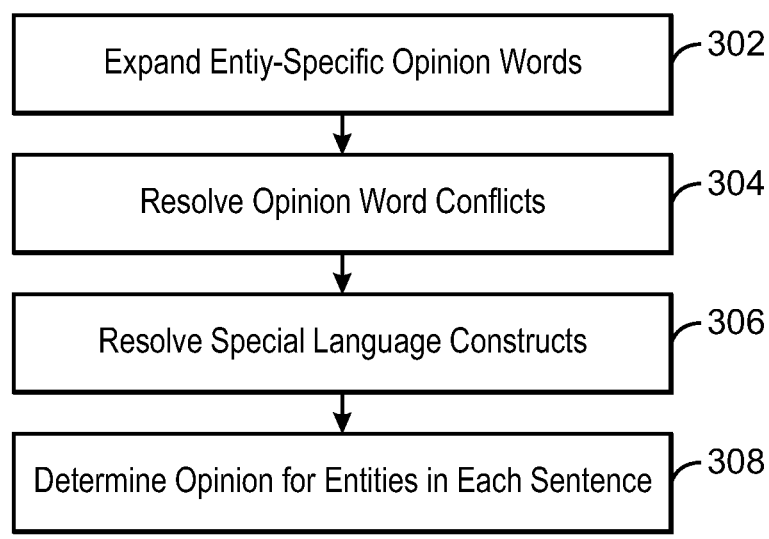
FIG. 3 is a process flow diagram for a method for performing sentiment analysis according to an embodiment of the present techniques.

FIG. 3 is a process flow diagram for a method 300 for performing sentiment analysis according to an embodiment of the present techniques. It should be understood that the method 300 is not intended to indicate a particular order of execution.

At block 302, domain-specific opinion words may be expanded. The polarities of some opinion words may differ depending on the context of the entity described. For example, the opinion word, "funny," may represent a positive opinion of a movie, but a negative opinion of a computer device, e.g., "the computer is acting funny." As such, the opinion lexicon may exclude domain-specific opinion words. Such opinion words may be expanded based on context. In other words, the polarities of such words may be determined based on their context. In one embodiment, coordination patterns may be used to expand domain-specific opinion words. A coordination pattern is a linguistic structure whereby two or more tokens are connected by a linking-word, such as "but," "and," "neither," "nor," etc. If a domain-specific opinion word is connected with a word from the opinion lexicon, the polarity of the domain-specific opinion word may be determined based on the coordination relation. For example, a microblog, "This movie is great and funny!" Because the word, "great," may be positive according to the opinion lexicon, the sentiment analyzer 118 may assign a positive polarity to the word, "funny" in this context. However, in the sentence, "It is a good movie, but cheesy," the sentiment analyzer 118 may assign a negative opinion value to the word, "cheesy," in this context.

At block 304, the sentiment analyzer 118 may resolve opinion word conflicts. In some cases, multiple opinion words with opposite polarities may describe the same entity. For example, a microblog may state, "This movie is darn good." In this case, the opinion words, "darn" and "good" both describe the movie. However, "darn" may be a negative opinion word, while "good" is positive. In this context, the combination of these two opinion words is a positive opinion. As such, in cases where conflicting opinion words occur sequentially, the sentiment analyzer 118 may assign an overall opinion polarity as the second opinion word. Moreover, in some cases, conflicting opinion words may represent in a coordination relation. For example, a microblog may state, "this movie has some awesome but silly scenes," or "This is a good but confusing movie." In these cases, the conflicted opinion words are connected with conjunction word "but". "awesome" and "good" represent positive opinions, but "silly" and "confusing" represent negative opinions. In such cases, the orientation of opinion may be relaxed, and an ambiguity value of opinion words may be determined. The ambiguity value may represent opinion word value along a scale in the context, instead of fixed values (positive 1 or negative −1). For example, Equation 1 may represent the ambiguity value for an opinion word w:

$$A_w = \frac{\sum_z \text{opinion word}}{\sum_i \text{positive word} - \sum_j \text{negative word}},\qquad\text{EQUATION 1}$$

where $z<=i+j$, and where $A_w$ is a positive or negative ambiguity value, which represents a positive or negative opinion, respectively. The term z, represents the number of times the word appears (in a text window, size=6) with opinion words; i represent the number of times the opinion word appears (in a text window, size=6) with a positive opinion word in context; j is the number of times the opinion word appears (in a text window, size=6) with a negative opinion word in context. Then, we assign an overall polarity for the conflicting case by the opinion word, which has highest ambiguity value (absolute value).

At block 306, special language constructs may be resolved. Special language constructs may include slang, idioms, orientation changing verbs, and sarcasm and sentimental hashtags. In one embodiment, the DBMS 112 may include a lexicon of idioms and slang with assigned opinion polarities. In such an embodiment, a negative opinion word, like "kill," may be changed sentiment orientation to neutral in a microblog stating, "I am playing with this device just to kill time." An orientation changing verb may be a verb that that changes the orientation of an opinion word in the context, e.g., from positive to negative. For example, a microblog may state, "The actor lost popularity after that article was published." The opinion word, "popularity," may represent a positive opinion. However, the verb, "lost," changes that positive opinion to a negative one. Other examples of orientation changing verbs include "decrease", "diminish", "prevent", etc. Besides, the sentiment analyzer 118 may flip the value of an opinion word, when expressed sarcastically. For example, a microblog may place quote marks around an opinion word, indicating sarcasm: "I received 'excellent' service at that shop." While "excellent" is a positive opinion word, the quote marks may indicate sarcasm. As such, the sentiment analyzer 118 may change the opinion value of this opinion word to negative in this context. Some microblog (TWITTER®) may include #sarcasm hashtag which explicitly indicates sarcasm. Accordingly, the sentiment analyzer 118 may also change the opinion value in tweets and other microblogs including this hashtag. What is more, some tags are sentiment tags in which assign sentiment orientation to the microblogs (TWITTER®), e.g. "#Fail", and "#sucks". We manually add such frequently used opinion hashtags into our general opinion lexicon.

At block 308, the sentiment analyzer 118 may determine the opinion of entities in each sentence of the microblogs. The opinion words in the sentence may be identified by matching to words in opinion lexicon, or words through the opinion word expansion described with reference to block 212. For sentences with two entities, the sentiment analyzer 118 may determine if the sentence includes a conjunctive or comparative relationship. In other words, are the entities being combined in regard to this opinion, or are the entities being compared? In the sentence, "X and Y are good !" the entities are being combined. As such, the same positive opinion orientation may be assigned to both entities, e.g., X and Y.

In the sentence, "X is much better than Y," the two entities are being compared. Comparative words, such as "better," may be identified by the POS tagging described above, which include comparative adjectives, verbs, superlative adjectives and adverbs. In this case, the opinion of each entity may be determined based on the opinion word polarity, and the relative position between two entities in the sentence. For example, if the opinion word is positive, the first entity is assigned a positive opinion, while the second entity may be assigned a negative opinion. The sentiment analyzer 118 may also take negation into consideration.

For the sentence without conjunctive or comparative relationship for entities, the sentiment analyzer 118 may perform dependency parsing for the sentence. Dependency parsing may find dependency relationships between the opinion word and entity in the sentence. If a dependency relationship exists between entity and opinion word, the polarity of the opinion word may be assigned to the entity. For example, a microblog may include the following sentence, "Apple performs pretty well in bad economic times." People express positive opinion on the entity "Apple" but negative opinion on the entity "economic times". Thus, we need to distinguish the opinion words expressed on different entities. We design an opinion assignment method which takes both dependency relation and word distance between the entity and opinion word into account. Dependency grammar describes the dependency relations between words in a sentence. Since the words in a sentence are linked each other by a certain relation. The relation between two word A and B can be described as A (or B) depends on B (or A). For example, in a simple sentence "I like iPad". "iPad" depends on the opinion verb "like" with the relation obj. In summary, we can generate following rules with dependency relations to do opinion polarity assignment.
Rule 1: A→A-Dep→B
It means A depends on B through a relation A-Dep. e.g. "I love iPad."
Rule 2: A→A-Dep→D←B-Dep→B
It means both A and B depends on D through relation A-Dep and B-Dep respectively.
e.g: "Harry Potter is awesome."
Rule 3: A→A-Dep→D→D-Dep→B
It means that A depends on B through two relations A-Dep and D-Dep. e.g: "Apple performs well." This type of rule is only applied to adverbs.
where A is an opinion word and B is an entity, A-Dep/B-Dep is a dependency relation, which describes a relation between words, and includes mod, pnmod, subj, s, obj, obj2 and desc. D could be any word. For the example in rule 1, given entity "iPad", we can identify its dependent opinion word "love". For the example in rule 2, given entity "Harry Potter", we can find its corresponding opinion word "awesome". Here D is the word "is". For the example in rule 3, we can find the opinion adverb "well" depends on verb "performs", which depends on the entity "Apple". From the indirect dependent relation, we can assign opinion word "well" to the entity "Apple".

The sentiment analyzer 118 also takes into account any negation in the sentence. For example, if the sentence was, instead, "The TV is not good," the sentiment analyzer 118 may determine that the sentence expresses a negative opinion of the TV. Because emoticons, colloquial expressions, abbreviations, etc. are frequently used in microblogs, such ungrammatical conventions may make it hard to find correct dependency relations between opinion words and entity. For example, in a sentence "Awesome saw Harry Potter yesterday even the weather is bad". We cannot find any dependency relation between opinion words with entity "Harry Potter". Under this circumstance, we adopt a simple distance metric to do the opinion assignment. That is, we determine the opinion orientation of the entity by its closest opinion word. The intuition behind the proposed method is that far away opinion words may not modify the current entity. However, setting a distance range/limit within which the opinion words are considered does not perform well either because in some cases, the opinion words may be far away. In the preceding example, we can assign opinion word "awesome" to the entity "Harry Potter". Thus, the opinion about the entity "Harry Potter" is positive. If both opinion words and polarity assignment relation do not exist for the entity in the sentence, the opinion for the entity is neutral.

Figure 4:
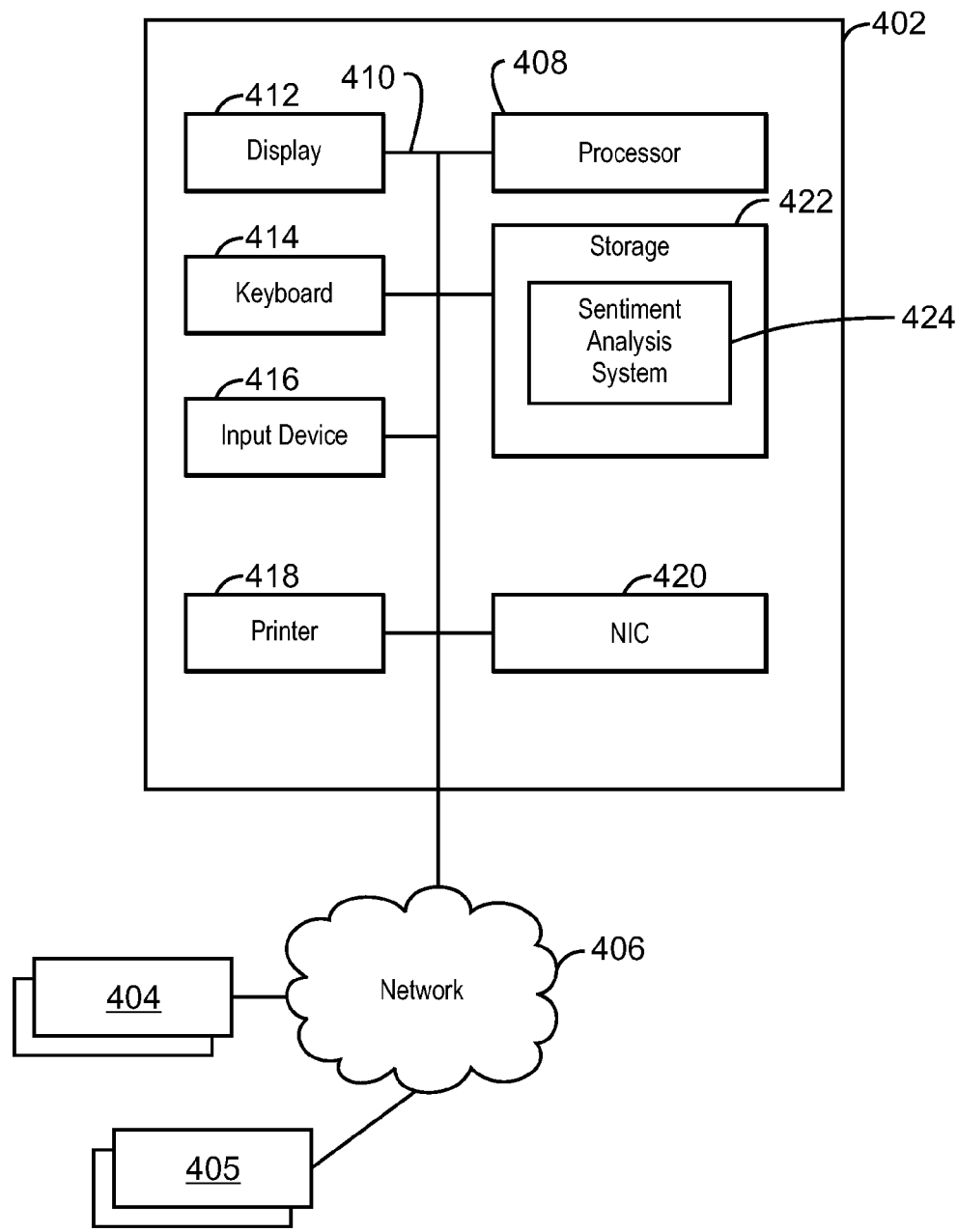
FIG. 4 is a block diagram of a system for performing sentiment analysis in accordance with an embodiment of the present techniques.

FIG. 4 is a block diagram of a system 400 for performing sentiment analysis in accordance with an embodiment of the present techniques. The functional blocks and devices shown in FIG. 4 may comprise hardware elements, software elements, or some combination of software and hardware. The hardware elements may include circuitry. The software elements may include computer code stored as machine-readable instructions on a non-transitory, computer-readable medium. Additionally, the functional blocks and devices of the system 400 are but one example of functional blocks and devices that may be implemented in an example. Specific functional blocks may be defined based on design considerations for a particular electronic device.

The system 400 may include an application server 402, in communication with clients 404, and microblog sources 405, over a network 406. The application server 402 may perform sentiment analysis on microblogging data acquired from the microblog sources. The clients 404 may be used to request and view the results of sentiment analysis about various entities. The microblog sources 405 may include live streams, crawled content, and targeted content. The microblog sources 405 may be available to the application server 402 via HTTP connections. In the case of live streams, a real-time, persistent connection may be used. In the case of crawled content, an application program interface (API) may be used to access this microblogging data.

The application server 402 may include a processor 408, which may be connected through a bus 410 to a display 412, a keyboard 414, an input device 416, and an output device, such as a printer 418. The input devices 416 may include devices such as a mouse or touch screen. The application server 402 may also be connected through the bus 410 to a network interface card 420. The network interface card 420 may connect the computational nodes 402 to the network 406. The network 406 may be a local area network, a wide area network, such as the Internet, or another network configuration. The network 406 may include routers, switches, modems, or any other kind of interface device used for interconnection. In one example, the network 406 may be the Internet.

The application server 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory. The storage 422 may include the machine readable instructions used to implement the methods discussed herein. In an example, the storage 422 may include a sentiment analysis system 424. The sentiment analysis system may perform sentiment analysis on data from the microblog sources 405. Further, the sentiment analysis system 424 may provide the client 404 with visualizations of the results of the sentiment analysis.

Figure 5:
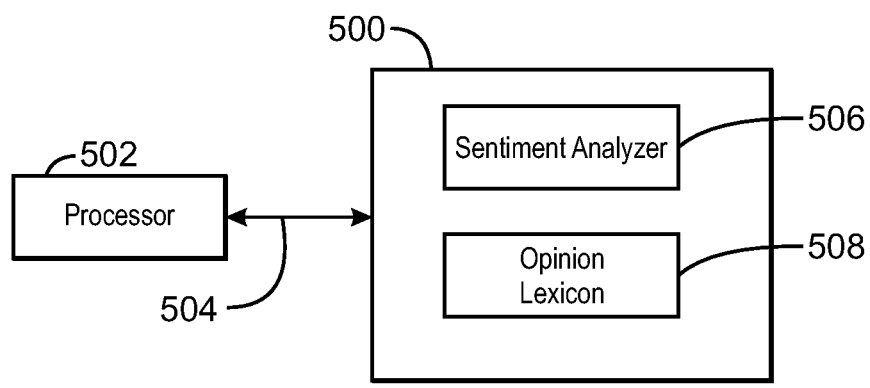
FIG. 5 is a block diagram showing a tangible, machine-readable medium that stores code adapted to perform sentiment analysis according to an exemplary embodiment of the present techniques.

FIG. 5 is a block diagram showing a tangible, machine-readable medium 500 that stores code adapted to perform sentiment analysis according to an exemplary embodiment of the present techniques. The tangible, machine-readable medium 500 may correspond to any typical storage device that stores computer-implemented instructions, such as programming code or the like. Moreover, tangible, machine-readable medium 500 may be included in the storage 422 shown in FIG. 4. When read and executed by a processor 502, the instructions stored on the tangible, machine-readable medium 500 are adapted to cause the processor 502 to perform sentiment analysis.

The tangible, machine-readable medium 500 stores a sentiment analyzer 506 and opinion lexicon 508. The sentiment analyzer 506 determines opinions on various entities discussed in microblogs, based on the opinion lexicon.

What is claimed is:

1. A computer-implemented method of determining an opinion of an entity described in a microblog, comprising:
identifying one or more sentences in the microblog comprising the entity;
identifying one or more opinion words in the sentences based on an opinion lexicon;
determining, for each of the sentences, an opinion value for the entity based on an opinion value for each of the opinion words in an opinion lexicon, wherein one of the sentences comprises a first opinion word and a second opinion word, wherein an opinion value of the first opinion word is in conflict with a an opinion value of the second opinion word; and
assigning an opinion value of the second opinion word to the opinion value of the entity if the second opinion word occurs sequentially after the first opinion word.

2. The method recited in claim 1, wherein determining the opinion value for the entity comprises:
identifying an entity-specific opinion word;
identifying a relationship between the entity-specific opinion word and one of the opinion words;
determining an opinion value for the entity-specific opinion word based on the relationship; and
determining the opinion value for the entity based on the opinion value for the entity-specific opinion word.

3. The method recited in claim 1, wherein determining the opinion value for the entity comprises:
resolving a conflict between a first opinion word with a positive opinion value, and a second opinion word with a negative opinion value, wherein one of the sentences comprises the first opinion word and the second opinion word; and
determining the opinion value for the entity based on a resolution of the conflict.

4. The method recited in claim 3, comprising assigning an ambiguity value to each of the first opinion word and the second opinion word, wherein the ambiguity value for word w comprises a number of times that the word w occurs with opinion words in microblogs divided by a difference between a number of times that the word w occurs with opinion words related to a positive opinion, and a number of times that the word w occurs with opinion words related to a negative opinion.

5. The method recited in claim 1, wherein determining the opinion value for the entity comprises:
performing dependency parsing to find a dependency relationship between one of the opinion words and the entity; and
determining the opinion value for the entity based on an opinion value for the one of the opinion words.

6. The method recited in claim 1, wherein determining the opinion value for the entity comprises determining the opinion value in sentences that are not questions.

7. The method recited in claim 1, wherein determining the opinion value for the entity comprises:
determining that one of the opinion words is expressed sarcastically; and
reversing an opinion value for the one of the opinion words.

8. The method recited in claim 1, wherein determining the opinion value for the entity comprises:
determining that the microblog is expressed sarcastically; and
reversing an opinion value for the entity.

9. A computer system for performing sentiment analysis, the computer system comprising:
a processor that is adapted to execute stored instructions; and
a memory device that stores instructions, the memory device comprising:
computer-implemented code adapted to identify one or more sentences in a microblog comprising an entity;

computer-implemented code adapted to identify one or more opinion words associated with the entity in the sentences based on an opinion lexicon;

computer-implemented code adapted to determine, for each of the sentences, an opinion value for the entity based on an opinion value for each of the opinion words in an opinion lexicon lexicon, wherein one of the sentences comprises a first opinion word and a second opinion word, wherein an opinion value of the first opinion word is in conflict with a an opinion value of the second opinion word; and computer-implemented code adapted to assign an opinion value of the second opinion word to the opinion value of the entity if the second opinion word occurs sequentially after the first opinion word.

10. The computer system recited in claim 9, wherein the computer-implemented code adapted to determine the opinion value for the entity comprises computer-implemented code that is adapted to:

identify an entity-specific opinion word;

identify a relationship between the entity-specific opinion word and one of the opinion words;

determine an opinion value for the entity-specific opinion word based on the relationship; and determine the opinion value for the entity based on the opinion value for the entity-specific opinion word.

11. The computer system recited in claim 9, wherein the computer-implemented code is adapted to determine the opinion value for the entity comprises computer-implemented code adapted to:

resolve a conflict between a first opinion word with a positive opinion value, and a second opinion word with a negative opinion value, wherein one of the sentences comprises the first opinion word and the second opinion word; and determine the opinion value for the entity based on a resolution of the conflict.

12. The computer system recited in claim 11, comprising computer-implemented code that is adapted to assign an ambiguity value to the first opinion word and the second opinion word, wherein the ambiguity value of the word w comprises a number of times that word w occurs with opinion word in the microblogs divided by a difference between a number of times that word w occurs with the opinion words related to a positive opinion, and a number of times that word w occurs with the opinion words related to a negative opinion.

13. The computer system recited in claim 9, wherein the computer-implemented code is adapted to determine the opinion value for the entity comprises computer-implemented code adapted to:

perform dependency parsing to find a dependency relationship between one of the opinion words and the entity; and determine the opinion value for the entity based on an opinion value for the one of the opinion words.

14. The computer system recited in claim 9, wherein the computer-implemented code is adapted to determine the opinion value for the entity comprises computer-implemented code adapted to determine the opinion value in sentences that are not questions.

15. The computer system recited in claim 9, wherein the computer-implemented code adapted to determine the opinion value for the entity comprises computer-implemented code adapted to:

determine that one of the opinion words is expressed sarcastically; and reverse an opinion value for the one of the opinion words.

16. The computer system recited in claim 9, wherein the computer-implemented code is adapted to determine the opinion value for the entity comprises computer-implemented code adapted to:

determine that the microblog is expressed sarcastically; and reverse an opinion value for the entity.

17. A non-transitory, machine-readable medium that stores machine-readable instructions executable by a processor to perform sentiment analysis, the tangible, machine-readable medium comprising:

machine-readable instructions that, when executed by the processor, identify one or more sentences in a microblog comprising an entity, wherein the one or more sentences comprise a question;

machine-readable instructions that, when executed by the processor, identify one or more opinion words associated with the entity in the sentences based on an opinion lexicon;

machine-readable instructions that, when executed by the processor, determine for each sentence, an opinion value for the entity based on an opinion value for each of the opinion words in an opinion lexicon, wherein one of the sentences comprises a first opinion word and a second opinion word, wherein an opinion value of the first opinion word is in conflict with a an opinion value of the second opinion word; and machine-readable instructions that, when executed by the processor, assign an opinion value of the second opinion word to the opinion value if the second opinion word occurs sequentially after the first opinion word.

18. The non-transitory, machine-readable medium recited in claim 17, comprising:

machine-readable instructions that, when executed by the processor, identify an entity-specific opinion word;

machine-readable instructions that, when executed by the processor, identify a relationship between the entity-specific opinion word and one of the opinion words;

machine-readable instructions that, when executed by the processor, determine an opinion value for the entity-specific opinion word based on the relationship; and machine-readable instructions that, when executed by the processor, determine the opinion value for the entity based on the opinion value for the entity-specific opinion word.

* * * * *

UNITED STATES PATENT AND TRADEMARK OFFICE
CERTIFICATE OF CORRECTION

| | | |
|---|---|---|
| PATENT NO. | : 9,009,024 B2 | Page 1 of 1 |
| APPLICATION NO. | : 13/280040 | |
| DATED | : April 14, 2015 | |
| INVENTOR(S) | : Lei Zhang et al. | |

It is certified that error appears in the above-identified patent and that said Letters Patent is hereby corrected as shown below:

In the Claims

In column 8, line 6, in Claim 1, delete "a an" and insert -- an --, therefor.

In column 9, line 7, in Claim 9. delete "lexicon lexicon" and insert -- lexicon --, therefor.

In column 9, line 10, in Claim 9, delete "a an" and insert -- an --, therefor.

In column 10, line 37 approx., in Claim 17, delete "a an" and insert -- an --, therefor.

Signed and Sealed this
Eighth Day of September, 2015

Michelle K. Lee
*Director of the United States Patent and Trademark Office*